Patented June 10, 1930

1,762,930

UNITED STATES PATENT OFFICE

GEORGE J. MANSON, OF HAWKESBURY, ONTARIO, CANADA

ART OF PAPER MAKING

No Drawing.    Application filed October 24, 1927.   Serial No. 228,494.

This invention relates to paper products and to the art of paper making especially in conjunction with the employment of waterproofing and sizing compositions comprising either wax, mineral oil, asphalt, asphaltic substances, pitches, tars, rosin and other resins and the like, or mixtures of two or more of these as will be more fully hereinafter described and illustrated by a series of examples and preferred procedures.

Since the invention in its specific embodiments is concerned particularly with such waterproofing and sizing compositions and their manner of incorporation with paper pulp to obtain, ultimately, paper or board of improved water resistance, good strength and other desirable qualities, I shall first describe the preferred mode of preparation of such compositions.

In the following illustrations I set forth procedures for obtaining the aforesaid wax, asphalt, rosin and the like in dispersed form, encysted with a coating preferably of the nature of a hydrophilic colloid, preferably inorganic, e. g. precipitated silicic acid or gelatinous silica, but it should be understood that by virtue of such illustrative procedures I do not thereby impose any limitations with respect to the scope of the invention.

Example 1

|                  | Parts by weight |
|------------------|-----------------|
| Paraffin wax     | 33              |
| Silicate of soda | 4               |
| Alum             | 2               |
| Glue             | 1               |
| Water            | 60              |

The silicate of soda used in the above formula is a commercial form of syrupy consistency containing about 50 per cent of water. This silicate of soda syrup was mixed with 65 per cent of the total water. The remaining 35 per cent of the total water was used to dissolve the alum. The glue was added to the diluted silicate of soda. The wax composition was prepared by first melting the wax, adding the silicate of soda solution containing the glue and agitating, finally adding the alum solution with agitation. The temperature at which the composition is prepared is about 170° F.

Example 2

|                  | Parts by weight |
|------------------|-----------------|
| Paraffin wax     | 32.5            |
| Montan wax       | 0.85            |
| Silicate of soda | 5               |
| Alum             | 2.75            |
| Glue             | 0.4             |
| Water            | 58.5            |

In this case, as in Example 1, the silicate of soda specified is a syrup containing about 50 per cent of water. In like manner this syrup is diluted with 65 per cent of the total water and the alum is dissolved in the remainder of the water employed.

The glue is dissolved in the silicate of soda solution. It is desirable to add 1 or 2 per cent of phenol, based on the amount of glue, in order to preserve the latter. The waxes are melted together and the silicate of soda solution containing the glue is added thereto with thorough agitation, the temperature being about 170° F. The alum solution is then added and agitation continued for a short time.

Example 3

|                  | Parts by weight |
|------------------|-----------------|
| Paraffin wax     | 31              |
| Montan wax       | 7               |
| Silicate of soda | 2.65            |
| Alum             | 1.35            |
| Water            | 58              |

The silicate of soda syrup is diluted with a part of the water and the alum is diluted with the remainder, somewhat similar to the manner set forth in Examples 1 and 2. The waxes are melted together and the silicate of soda solution is added thereto with vigorous agitation at a working temperature of 170° F. When the incorporation is thoroughly effected, the alum solution is introduced. A very fine wax dispersion results.

*Example 4*

| | Parts by weight |
|---|---|
| Paraffin wax | 37 |
| Quick lime | 1.7 |
| Alum | 4.6 |
| Water | 56.7 |

The quick lime is treated with about 65 per cent of the total water and the alum is dissolved in the remaining water. The wax is melted and placed in an agitator and the milk of lime is added. After stirring vigorously for about one minute the alum solution is added and agitation continued for two minutes, when the wax composition is ready for use. As in the foregoing, it is recommended that the working temperature in the preparation of the wax composition be about 170° F.

I prefer to dilute the wax composition (which comes from the agitator containing approximately 30 per cent of waxy material) until it contains about 5 per cent of waxy material and add it in the diluted state to the beater through a screen of about 60 mesh. I have found that this insures a better dispersion through the stock in the beater. When using sizes containing rosin soaps and free rosin it is necessary to closely control the acidity of the stock after the size is added to assure proper coagulation of the size on the fibres, this acidity having a value corresponding to pH of about 4.5. Rosin size, furthermore, should be preferably added to stock that is slightly alkaline. I have found that when the wax composition involved in the present invention is used that the acidity of the paper stock, after said composition is added, is not at all critical, and may vary from an acidity corresponding to a pH value of 4.5 to 7, without materially affecting the retention of the wax by the fibre. I have also found that the wax composition can be added to the pulp if the pulp is acid, that is, corresponding to a pH value of from 4.5 to 6.5. In this case it is not necessary to add any further precipitant such as alum. This allows of a considerable saving of alum. The stock being less acid increases the life of the various parts of the system such as pumps, piping and wires.

The following will serve as an illustration of the beneficial effect of the use of this wax composition:

A plant engaged in the forming of pulp articles and using ordinary standard rosin size had considerable difficulty due to the rosin adhering to the wires on the forming machines, making a product which had badly formed edges and holes. They also had trouble with their piping system and pumps on account of the acidity of the stock due to the use of the amount of alum necessary to precipitate the rosin size. In this plant when rosin size was discontinued and a wax composition made in the manner above set forth was employed no trouble was experienced with the products sticking to the wires on the forming machine, and furthermore the production was increased at least 15 per cent, with the product being uniformly much cleaner on the edges and tougher, that is, not as brittle as previously.

As the pulp was nearly neutral to litmus when the wax size was used there would not be the expected deterioration of the pipings and pumps consequent on the procedure involved in using rosin size.

I have found that using wax composition mentioned above, a retention of the wax on the fibres of from 75 per cent to 90 per cent, depending on the nature of the stock, resulted. Moreover, any wax that is not retained on the fibre does not adhere to the felts or wires of the paper machine or forming machines, but is carried away with the "white water". Sizing materials which do not adhere to the pulp fibres must not adhere to the felt and to the wires, as this would prevent drainage of the pulp sheet and cause holes in the sheet, or spots on the surface of the sheet.

I have found that the addition of only 1½ per cent of wax will give water resisting qualities satisfactory for the ordinary uses to which paper products are put, although for special purposes the amount of wax can be increased to 4 or 5 per cent. I have found that the addition of wax up to 5 per cent tends to increase the strength and to improve the "rattle" or stiffness. This is a surprising result as paraffin wax has been supposed to have a lubricating action on fibres and thus yield a weak limp paper. Paper containing this wax dispersion is not as susceptible to changes in atmospheric moisture, and for this reason is peculiarly adapted to use in the printing trade where it is necessary to register two or more impressions. I have found that paper containing 1 to 1½ per cent of wax and 1 to 2 per cent of rosin, the rosin being added as ordinary rosin size, does not lose strength when subjected to the action of a greasy material as paper does when it is only sized with the ordinary rosin size. This property makes the use of such a type of emulsion in paper for food containers and greasy articles very valuable.

My invention allows pulp receptacles such as pie plates, butter trays and the like to be efficiently prepared in the manner delineated above, using molding screens of the shape requisite to form the desired receptacle. Pulp containing the above type of dispersion is distributed over these screens to coat them uniformly and yield on drying a pulp or paper receptacle of good water resistance.

When the plant aforesaid was using ordinary rosin size it was necessary for them to use fresh water in the beater and to dilute the stock before it went to the forming machines. As this water was pumped from artesian wells it was an item of considerable expense. With the wax composition the plant could be worked in a closed system, that is, the water drained from the forming machines was returned to the beaters and the make-up chests. It is possible to do this when using the wax composition because the wax therein is not critical as regards the acidity of the stock in the beater when the said composition is added and the amount of alum necessary to adjust the acidity is very small. In the particular instance cited, less than one-tenth of the alum that was used with the rosin size was used with the wax composition.

The formation of a wax dispersion composition in the manner described above, that is, adding a precipitating substance to a mixture of wax, water and an emulsifying agent, produces what may be termed a pre-set or encysted wax dispersion. Instead of forming an emulsion of wax by means of an emulsifying substance such as soap, adding this emulsion to the pulp in the beater, and then introducing a precipitant, I prefer to accomplish a part at least of the precipitation in advance of introduction of the wax dispersion or emulsion into the paper pulp stock. By employing such a pre-set or partially pre-set wax dispersion composition, preferably containing paraffin wax as the principal waxy component, I am enabled to produce a composition having the novel property of being absorbable by paper pulp stock in large proportion, that is, the major proportion of the wax is readily taken up by the pulp, with or without the addition of additional precipitant, and the minor proportion of said dispersion composition, usually representing only from 10 to 20 per cent of the entire wax, being capable of passing through the screen, felt or other web (upon which the pulp is formed into a sheet) without fouling and obstructing said web. In this respect I believe that I have obtained a wax dispersion composition possessiong qualities of great importance in the manufacture of water resisting paper, pressboard, and the like.

As indicated by the foregoing this form of the water-resistant paper is prepared by adding the wax dispersion composition to pulp at any suitable stage prior to formation of the pulp into a sheet. Thus the composition may be added to best advantage in the beater engine. The paper stock may be any suitable material such as sulphite pulp, sulphate pulp, or kraft stock, newsprint, ground wood, and the like, or mixtures of these. In some cases, rag stock may be added. Preferably, as indicated, the proportion of wax in the finished paper may be from 1 to 2 per cent, to secure a considerable degree of water resistance and larger proportions of wax, such as 4 or 5 per cent, or, in some cases, even higher proportions, may be present. After the dispersion has been added and the beating completed an acid such as alum may be added to adjust the pH value and the stock formed into sheets, either continuous or discontinuous, or, the stock may be shaped in any suitable manner. The usual paper making machines, such as the cylinder machine and the Fourdrinier machine, may be employed, thus forming a layer of the paper pulp and wax composition on a felt or wire support, as the case may be. After drying the paper preferably is run through calender rolls. If pressboard is to be produced, this may be prepared on board machines.

In some cases, as has been indicated, rosin size may be introduced into the charge in the beater engine and a composite effect obtained by the presence in the paper of the waxy material and the rosin size. When the latter is used, it is essential to add to the pulp some substances such as alum, and the like, which will adjust the pH value so that the rosin will adhere to the pulp fibres. In such a case, therefore, preferably I incorporate the pre-set wax dispersion composition and rosin size with the paper pulp. In the finished paper there may be present from, say, 1 to 3 per cent of wax, and a like amount of rosin size material.

On the other hand there are numerous applications of paper products treated only with the pre-set wax dispersion composition and entirely free from rosin, which exhibit an unexpected strength and which have a desirable "crackle," such paper products falling within the purview of my invention. I consider a desirable embodiment of my invention a water-resistant paper (which includes also pressboard, and the like) containing not to exceed about 5 per cent of paraffin wax, conferring such properties as have been noted above. I also include, as another desirable form for some purposes, a paper which is free, or substantially free from rosin size, yet has not only many characteristics engendered in paper by rosin size, but in addition has greater water resistance than would be conferred upon paper sized with a corresponding amount of rosin size only.

It should be understood that pressboard, pulp board, and the like may not possess or be required to possess the "crackle" or "rattle" quality noted as a feature of the preferred embodiment in paper proper.

If rosin is mildly oxidized before saponification, when used with or without the addition of wax the resulting paper is better sized than when unoxidized rosin is used and the strength of the sheet is also improved. The oxidized rosin may be used alone or with a wax emulsion. The following gives fairly good results:

1 per cent of saponified oxidized rosin is added to the stock in the beater and 1 per cent wax emulsion made up as per Examples 1 to 4 is added to the beater.

Various proportions of the oxidized rosin size and wax size may be used. It is advantageous to add an alkali to the stock in the beater after the size has been added, as mentioned below:

By oxidized rosin, I refer in particular to a rosin that has absorbed oxygen so that its weight has been increased, say 2 to 5 per cent. This may be done in various ways, but the action can be expedited by exposing finely-powdered rosin at a temperature of 100° to 120° F. in the presence of a catalyzer such as lead. After the rosin is oxidized, it is saponified by the addition of a solution of an alkali such as ammonia, caustic soda or soda ash. The resulting product is quite fluid and intermingles with the stock in the beater very readily.

Oxidized rosin does not form a thick viscous gel when saponified as ordinary rosin does and therefore can be diluted indefinitely with water without emulsifying apparatus. The aqueous saponified solution possesses remarkable penetrating qualities due, perhaps, to its non-gel form and this quality may be responsible for the increased sizing effect noted over ordinary rosin size.

Example 5

| | Parts by weight |
|---|---|
| Paraffin wax | 31 |
| Silicate of soda | 2.65 |
| Alum | 1.35 |
| Rosin | 7 |
| Water | 58 |

The paraffin and rosin are melted together and the silicate of soda is diluted in 65 per cent of the total water. The wax, rosin and silicate of soda are added to the agitator at a temperature of 170° F. and thoroughly mixed and the alum dissolved in the remainder of water is added and agitation continued.

The foregoing formula (Example 5) serves both for ordinary rosin and oxidized rosin.

Reference has been made to beating pulp in an alkaline medium. This is advantageous in conjunction with sizing by means of wax, asphalt and other dispersions, especially those of an encysted character.

An illustration of a procedure of this type follows:

The stock is charged to the beater in the usual manner and the wax size is added. This wax size is preferably made by encysting wax particles with silicic acid. The molten wax is mixed with silicate of soda and sufficient acid such as hydrochloric is added to neutralize the silicate of soda and form silicic acid. After the wax is added to the stock in the beater, approximately four-tenths of one per cent of caustic soda or equivalent alkali (preferably in the form of solution) based on the air-dry weight of the pulp, is added to the beater. The addition of this alkali improves the retention of the wax and very surprisingly increases the strength of the finished product. Before the beater is dumped or discharged the pH value of the stock is adjusted with an acid such as hydrochloric or acid electrolyte until it is between 7.2 and 5.5. It is well to keep the white water within this range so that the stock goes to the paper machine at a pH within the range of 7.2 and 5.5. The wax desirably is introduced before the alkali is added, but good results can be obtained by adding the alkali first. If it is necessary to jordan the stock after it leaves the beater and before it goes to the paper machine the pH in the jordan may be maintained advantageously between 7.2 and 5.5.

As noted above, various raw materials may be employed as pulp in carrying out the present invention. If rags are used these are first sorted as to color and quality, then cut up and dusted to remove foreign materials, then washed and bleached. Sulphite pulp is generally purchased from the sulphite pulp manufacturer in the bleached form. Soda pulp also is purchased by the paper manufacturer in the bleached form. The soda pulp is used largely to bulk the better grades of book papers. Ground wood pulp is only used in the cheaper lines of book and writing papers. As ground wood yellows with age, it is generally bleached on the wet machine with a solution of sodium bisulphite.

These raw materials are charged to the beater in various proportions, depending on the quality of the paper desired. The amount of water added to the pulp will vary from 93 to 97 per cent, that is, the pulp will be from 7 to 3 per cent in the beater, depending on the nature of the beater. The beater draws out the fibres and puts them in shape so that they will felt well on the paper machine and the paper will have the desired finished texture and strength. When the beater is completely furnished with stock and the stock has circulated so that the pulp is well mixed with the water the wax or other dispersion herein set forth is added. Approximately 1 to 2% wax is thus introduced, although very few papers will require more than 1% of the wax (with or without rosin, and the like, in addition).

After the wax size is thoroughly incorporated with the fibres, I have found that it is advantageous to add an alkali as noted.

This may be approximately one half of one per cent of caustic soda, or slightly less (or the equivalent in soda ash or similar alkali) based on the dry weight of the pulp. When the pulp has been sufficiently beaten I may add sufficient acid such as hydrochloric acid, or an acid electrolyte, etc., to bring the pH value of the stock to a point between 7.2 and 5.5. The beater is then dumped and the stock is passed through a jordan to bring the fibres to a more or less uniform length and the brushing out action continued, after which the material goes to the stuff chests. From the stuff chests, which act as storage reservoirs for the paper machine, the stock is pumped to the flow box of the paper machine, and in the course of its travel is diluted with water to a composition of approximately 1 part of pulp to 250 parts of water. The amount of water will vary with various stocks and may go as low as 1:200 or as high as 1:400. It is desirable or essential that the diluting water have a pH value that will maintain the pH within the range mentioned above, that is 7.2 to 5.5. In using ordinary rosin sizes, the pH of the stock preferably is maintained approximately within the limit of 4.5 to 5.0. As will be seen the control of the pH value of the stock when using wax size is not as critical. The stock after dilution flows from the head box of the machine to the wire where the water of dilution is drained from it and the wax particles are left intimately in contact with the fibres. The formed sheet leaves the wire and passes between one or more press rolls to the dryers, and contains about 75% of water as it comes to the first dryers. As the sheet passes over the dryers it continues to lose water and increase in temperature so that any encysted wax is melted and ruptures the encysting walls. The wax is absorbed or adsorbed by the pulp fibres and most thoroughly and intimately diffused therethrough. After the sheet leaves the last dryer roll it passes between the calenders which compact the sheet and put a finish on the surface. As the wax particles are protected by the precipitated coat of insoluble gel I have found that they do not adhere to the wire or felts on which the sheet is formed, or to the press rolls through which the sheet passes after leaving the wire, nor does the wax cause the fibres to adhere to the calender rolls. My experience in using this wax size on paper machines has shown that there is much less difficulty in keeping the wires and machine clean when wax size is used than when rosin size is used. I have found that the use of the alkali in the beater with the wax size gives a better formed and stronger sheet, also, the sheet has an improved "snappiness" or "rattle."

A feature of my invention and an advancement which, so far as I am advised, I have made in the art of paper making is that of utilizing wax or analogous dispersion without clogging wire or felt.

This result applies not only to paper but to the thicker forms of pulp products known as boards. In using the term paper herein it is to be understood that I include pressboard, wall board, laminated or ply board and similar or analogous forms of sheeted pulp.

The better grades of board are made from ground wood and sulphite stock. Cheaper grades are prepared from old paper stock and straw pulp and the like.

The dispersions illustrated above, or the asphalt or pitch composition hereinafter described may be used with any of the above types of boards. Mixtures of these dispersions may be used in some cases.

As the boards are made up in plies on the board machine, the various stocks are generally furnished to separate beaters and not mixed in the beater, except in the case of the higher grade boards. The consistency of the stock may vary in the beater from 3 to 7 per cent and 1 to 2 per cent of wax usually is added.

Preferably alkali is added after the wax dispersion as previously mentioned and before the beater is dumped and the pH value is adusted to between 7.2 and 5.5. The stock may or may not be passed through a jordan, depending on the nature of the stock and the product desired. The stock (after leaving the jordan) goes to the stuff chests and from there to the various cylinders on the board machine.

On the board machine the pulp is formed into a sheet on a number of cylinders, generally from 5 to 7. If a high grade board is being made the stock on all the cylinders is the same. If lower grade boards are being made, the stock furnished to the cylinders which make the center of the board is of a lower grade than to those making the outer plies. The cylinders are arranged in a row at the back end of the board machine and have an endless felt which is carried over the top of all the cylinders. The cylinders are driven independently, but so that the peripheral speed of all is the same. The cylinder next to the dry end of the machine brings up a layer of pulp which is picked up by the underside of the felt and forms one of the outer layers of the board. The felt then carries this layer of pulp along to the second cylinder where another layer of pulp is picked up under the first layer and so on over the remaining cylinders until the last cylinder is reached which forms the other outer layer of the board. The felt carries the five to seven plies of stock over suction boxes or a suction roll where part of the water is removed and through rolls where a further amount of water is removed and the plies are compacted. After passing the last set of press rolls the wet board contains from 70 to 75 per cent of moisture and is carried on a felt to the first dryers.

Built up board of this character (plyboard) is usually 0/10 to 0/40″ in thickness and may, for example, be made up of ground wood in the outer plies and old paper stock in the center plies. Sometimes old paper may be used all the way through. An encysted asphalt dispersion may be used in the inner plies and encysted wax in the outer plies. This secures a well water-proofed board of light-colored exterior.

Various combinations of plies containing the different dispersions may be produced in accordance with my invention, e. g.

(A) Each outer ply_____Wax dispersion
    Inner ply or plies__Asphalt dispersion (B) Each outer ply_____Wax dispersion
    Next adjacent plies_No dispersion
    Inner ply or plies__Asphalt dispersion (C) A 5-ply board suitable for making cracker or biscuit caddy stock is constituted as follows:
    Ply #1__Wax dispersion
    Ply #2__Asphalt dispersion
    Ply #3__Asphalt dispersion
    Ply #4__Grease proof impregnum or dispersion
    Ply #5__Wax dispersion Ply #5 forms the inner surface of the caddy.

Pressboard may be from $\frac{1}{16}$ to ½″ or more in thickness and may be made from sugar cane fibre, flax fibre, straw, saw mill refuse, exploded fibre, rasped wood and the like. It is formed in the mass rather than as laminæ or plies and may be rendered water-resistant in a manner similar to the paper and board products previously described.

In making plyboard or pressboard, there is no sticking of the wax on the cylinder rolls, felts, dryer rolls or calender rolls. When ordinary rosin size is used sticking troubles are not infrequent, hence the present procedures, as illustrated, represent an advance in the art of board-making involving several co-operating improvements.

Ordinary rosin size is not very effective in its sizing properties if pH of the water of suspension is over 5 or 5.2 at the paper machine, irrespective of what the pH may have been at the beater. Using my process I have found pH up to 6.5 will readily yield an excellent sizing effect. For example, in one case a test sample of the finished paper (at machine pH 6.5) showed a water absorption not over 10% greater than a similar sample pH 4.5 at the machine.

I have mentioned the use of hydrochloric acid in precipitating silica in the gelatinous form, when forming the dispersion of wax or wax and rosin, asphalt and rosin and the like. I may use other acid precipitating substances, e. g. sulphuric acid, bisulphates, and other acids and acid salts.

Ammonium chloride may be used to accomplish precipitation under alkaline conditions.

Salts or bases which form insoluble hydrated silicates or zeolitic bodies such as calcium, magnesium, barium, zinc and aluminum hydrates, chlorides, and in some cases, sulphates, and the like may be used to form such silicates or mixtures of silicate and silicic acid.

My invention allows the use of an acid, e. g. hydrochloric acid (or other acid bodies including the acids and acid salts above mentioned) in place of the customary alum to add to the beater stock to complete the precipitation of any size or dispersion not fully "set". This is of especial value in the use of wax and rosin mixtures in the partially encysted form. In this case the pH usually is brought from 7.2 to 5.5 in the beater. Asphalt or pitch dispersions may be similarly treated.

By using a cheap acid such as hydrochloric acid, both in forming the encysted dispersion and in any final precipitation or set which the conditions of operation may require in the beater, I am able to dispense entirely with the more costly alum precipitants.

I prefer to employ sodium silicate as ordinary water glass is about the cheapest form for the purpose, but I may use potassium silicate or other substances producing an equivalent encysting effect.

Encystment, in my opinion, is important for at least two reasons.

Suitably encysted, the wax particles or particles of other waterproofing agents, do not gum or clog the wires, screens or felts, allowing a wider use of waterproofing agents for improving the water resistance of paper and board.

Wax coated with a layer of gelatinous silicic acid forms a particle readily adsorbed by hydrocellulose and thereby a high retention of the dispersion on the paper fibre is secured.

Retention is partly mechanical, and partly colloidal or molecular. The high retention of the dispersion by the fibre, which I obtain can be ascribed to colloidal or molecular forces engendered by encystment.

A considerable number of waxes may be used, e. g., hard waxes, carnauba, candelilla, Montan, shellac wax, and the like; or softer waxes, e. g., paraffin, ceresin, ozocerite, scale wax, wax tailings; or mixtures of the hard and soft waxes, with or without the addition of various grades of mineral or petroleum oils. By the term asphalt I include various asphaltic bodies, natural and blown asphalt, gilsonite, pitches, tars and so forth. Mixtures of these may be made with oils, waxes, rosin, and the like.

In the foregoing I have stressed wax dispersions since these occupy a special field, and one which hitherto has seen but little commercial development owing to clogging of wires and felts. From the standpoint of the paper industry I do not consider paraffin wax, for example, and asphalt to be equivalents. Their physical properties are different and, since paper is mostly required light in color, asphalt cannot be used in the majority of requirements.

I have also found that a paper sized with my wax dispersion does not lose its resistance to ink or water on exposure to ultraviolet rays as does paper sized with rosin. Paper sized with rosin also tends to yellow on exposure to ultraviolet light. This yellowing does not occur when a wax dispersion is used to size the paper.

Ultra violet light in a short time gives the same effect as a long period of exposure in daylight and shows the effect of "aging" in the paper under examination.

Asphalt, may, however, be encysted in accordance with the present invention and used for purposes where light color is not a requirement, or in ply-paper or ply-board as intermediate layers with light colored external layers as described under plyboard.

The following will serve to illustrate the encystment of asphalt to yield a product which I have found of commercial significance.

A soft asphalt with a melting point between 180° and 205° F. if treated in the following manner, gives an excellent material for waterproofing paper products.

The asphalt is melted and vigorously stirred with a hot solution of silicate of soda. After the silicate of soda and the asphalt are thoroughly mixed a quantity of alum is added sufficient to react extensively or completely with the silicate of soda. By this procedure the asphalt is obtained in a dispersed form which does not coagulate when the mixture cools.

*Example 6*

| | Parts by weight |
|---|---|
| Asphalt | 33 |
| Silicate of soda | 4 |
| Alum | 2 |
| Glue | 1 |
| Water | 60 |

The silicate of soda used in the above example is a commercial form of a syrupy consistency containing about 50 per cent water. It is mixed with 65 per cent of the total water, the remaining 35 per cent of water being used to dissolve the alum.

This encysted asphalt composition is prepared by melting the asphalt, adding the silicate of soda solution containing the glue and agitating, finally adding the alum solution with agitation. The temperature at which the composition was prepared is about 205° F.

*Example 7*

| | Parts by weight |
|---|---|
| Asphalt | 32.5 |
| Rosin | 0.85 |
| Silicate of soda | 5 |
| Alum | 2.75 |
| Glue | 0.4 |
| Water | 5.85 |

In this case, as in previous example, the silicate of soda is a syrup containing about 50 per cent water. In a similar manner this syrup is diluted with 65 per cent of the total water and the alum dissolved in the remainder. The glue is dissolved in the silicate of soda solution. It is desirable to add 1 or 2 per cent of phenol, based on the amount of glue, in order to preserve the latter. The asphalt and rosin are melted together and the silicate of soda solution containing the glue is added thereto with thorough agitation, the temperature being about 205° F. The alum solution is then added and agitation continued for a short time.

*Example 8*

| | Parts by weight |
|---|---|
| Asphalt | 31 |
| Rosin | 7 |
| Silicate of soda | 2.65 |
| Alum | 1.35 |
| Water | 58 |

The silicate of soda is diluted with part of the water and the alum is diluted with the remainder, somewhat similar to the manner set forth in Examples 6 and 7. The asphalt and rosin are melted together and the silicate of soda solution is added to them with vigorous agitation at a temperature about 205° F. When the mixture is thoroughly effected the solution is added. These mixtures can be further diluted before they are added to the beater. I have found that a dilution of about 5 per cent gives a better dispersion in the heater, although the encysted asphaltic dispersion can be successfully used as it comes from the mixer.

The foregoing compositions serve to illustrate the present invention, but it should be understood that these procedures are set forth solely for illustrative purposes and that various modifications with respect to proportions, temperatures and procedure and manner of incorporation may be utilized, also that substances of an equivalent character may replace one or more of the foregoing constituents.

Thus in the art of paper making my invention comprehends the steps which comprise incorporating a pre-set or substantially pre-set or encysted waterproofing and sizing agent with wet paper pulp and sheeting the pulp on a filter-web (e. g., wires, screens, felts) without clogging the web with said agent. More specifically my invention is concerned with an encysted agent of this character comprising paraffin or similar wax, a substance heretofore notorious for its clogging propensities.

In Example 6, a portion of the asphalt or pitch may be replaced by wax. In this manner the joint effect of the two substances, the asphalt body and the waxy body appears. By way of illustration, one-half of the asphalt may be substituted by a like amount of wax. In Examples 7 and 8, a portion of either the asphalt or the rosin likewise may be replaced by wax, to secure special properties. The amount of wax thus used may be for example one-quarter to one-half the amount of the asphalt, or of the rosin. Furthermore, in some cases, the rosin may be entirely superseded by the wax to secure particular properties.

The use of oxidized rosin with or without wax, since the latter may be omitted in some cases, not only yields a better sized product of greater strength, as described above, but also results in products of increased water resistance.

In using rosin sizes, since the isoelectric point of rosin soap lies between the pH values 4.5–4.7, the stock from the beater already lying within this pH range, the water of dilution which is used should desirably have a pH value of 4.5–4.7.

In the use of the wax composition set forth above, if the temperature in the beater is kept below the melting point of the wax, the most desirable condition for the dispersion of the wax is obtained.

As set forth at some length, the use of encysted wax and analogous materials in the making of paper offers marked advantages over the well-known prior art methods heretofore used. In the prior art methods in which wax sizes containing finely divided wax coated with a soap are used, the wax exhibited a tendency to come out in the manufacture of the product causing wax spots in the sheet, on the felts, on the wires and press rolls. The soap coating apparently breaks down and leaves the wax particles in a very sticky and tacky condition. Wax in this condition also lowers the strength and rattle of the sheet. On the other hand, wax or analogous material which is encysted in accordance with the invention hereinabove set forth, eliminates the disadvantages and trouble immediately referred to above. It does not fill the wires and felts or cause spots on the sheet. These advantages and novel functions which applicant's pre-set materials exhibit are observed facts. But certain theoretical considerations may be noted which may account for these obvious improvements in prior art practice as a result of the departure therefrom by the present invention, it being understood however that the invention is not to be limited by such theoretical considerations. In the type of composition which results by following the invention set forth herein, the wax or analogous material is covered with a coating which is "pre-set" or insoluble in water. Apparently, the coated particles are retained mechanically on the fibers as the water is drained away. Any wax which is not retained is carried away in the white water and does not adhere to the clothing of the machine. The retentions obtained are quite high, about 80 per cent. It appears that the wax is held intact in its encysting coating until the sheet is nearly dried, when the coating is ruptured and the wax is taken up by the fibers. The wax not being free during the felting and pressing of the fibers, that is during the formation of the sheet, it does not adversely affect such formation nor the strength of the sheet; and when the wax is finally freed as set forth above, it is so placed in the fibers that the qualities of the sheet instead of being impaired which was true in prior art products, are improved materially. Yet it is impossible to detect with the eye any difference between a sheet wax sized and one rosin sized.

What I claim is:—

1. In the art of paper making, the step which comprises incorporating rosin and an encysted water-proofing agent with wet paper pulp and sheeting the pulp on a filter-web without clogging the web with said agent.

2. A process as set forth in claim 1 in which the water-proofing agent is paraffin wax.

3. The art of paper making which comprises beating fibrous pulp, incorporating an encysted water-proofing agent and rosin with said pulp, adding a precipitant and sheeting the pulp.

4. The art of paper making which comprises beating fibrous pulp, incorporating encysted wax and oxidized rosin, adding a substance modifying the pH value whereby deposition on the pulp results, and sheeting the pulp.

5. In the art of paper making, the step which comprises incorporating oxidized rosin with fibrous pulp and then sheeting the pulp.

6. The art of paper making which comprises beating fibrous pulp, incorporating an encysted water-proofing agent and oxidized rosin, rendering the pulp slightly alkaline, beating, adding an acid, and then sheeting the pulp.

7. In the art of paper making, to secure maximum retention of size, the step which consists in adjusting the pH value of the water of dilution of the beater stock prior to sheet formation so as not to alter substantially the pH value of said stock.

8. As an article of manufacture, a paper comprising fibrous pulp of pronounced water resisting qualities containing resin and pre-dispersed wax.

9. As an article of manufacture, a paper comprising fibrous pulp, of pronounced water resisting qualities containing oxidized rosin and pre-dispersed and pre-encysted wax comprising paraffin wax.

10. As an article of manufacture, a paper comprising fibrous pulp of pronounced water resisting qualities containing pre-dispersed and pre-encysted wax and rosin.

11. A waxed paper containing silicic cystshells.

12. As an article of manufacture, a paper comprising fibrous pulp of pronounced water resisting qualities containing oxidized rosin.

13. A paper made from fibrous pulp containing a resin and a non-fourling wax composition.

14. A paper made from fibrous pulp containing a non-fouling wax composition and oxidized rosin.

15. A paper product made from fibrous pulp containing oxidized rosin.

16. A paper made from fibrous pulp containing a resin and a wax dispersion, the particles of wax being present under conditions such that fouling does not occur under the usual conditions prevailing on paper-making machines.

17. In the art of making paper, the step which comprises forming paper for fibrous pulp containing a non-fouling wax composition containing rosin.

18. In the art of making paper, the step which comprises forming paper from a fibrous pulp containing a non-fouling wax composition and oxidized rosin.

19. In the art of making paper, the step which comprises forming paper from a fibrous pulp containing a wax and resin dispersion, the particles of wax being present under conditions such that fouling does not occur under the usual conditions prevailing on paper-making machines.

20. In the art of making paper products, the step which comprises incorporating oxidized rosin with fibrous pulp.

21. In the art of making paper, the steps which comprise incorporating with fibrous pulp, rosin and a non-fouling wax composition, and sheeting the pulp.

22. In the art of making paper, the steps which comprise incorporating with a fibrous pulp, a wax and resin dispersion, the particles of wax and resin being present under conditions such that fouling does not occur under the usual conditions prevailing on paper-making machines; and sheeting the pulp.

23. In the process of making paper manufactures, the step which comprises adding to paper pulp a pre-set wax dispersion composition containing rosin.

24. In the process of making paper manufactures, the step which comprises adding to paper pulp in the beater a quantity of wax dispersion composition which is at least partially pre-set and which also contains rosin, sufficient to yield a finished paper containing from 1 to 1½% of wax and from 1 to 2% of rosin.

25. In the process of making paper manufactures, the step which comprises adding to paper pulp in the beater a pre-set wax dispersion composition containing rosin and then adding a precipitant for the rosin to the pulp-wax mixture.

26. In the art of making paper, the steps which comprise incorporating with fibrous pulp, rosin and a non-fouling wax-petroleum oil composition, and sheeting the pulp.

27. In the art of making paper, the steps which comprise incorporating with fibrous pulp, a non-fouling wax-mineral oil composition, and sheeting the pulp.

28. In the process of making paper manufactures, the step which comprises adding to paper pulp a pre-set wax-mineral oil dispersion composition containing rosin.

29. In the process of making paper manufactures, the step which comprises adding to paper pulp a pre-set wax-petroleum oil dispersion composition.

30. A paper product made from fibrous pulp containing a wax-mineral oil dispersion, the particles of wax being present under conditions such that fouling does not occur under the usual conditions prevailing on paper making machines.

GEO. J. MANSON.